US007332674B2

(12) United States Patent
Peterson et al.

(10) Patent No.: US 7,332,674 B2
(45) Date of Patent: Feb. 19, 2008

(54) ELECTRICAL SPLICE ASSEMBLY

(75) Inventors: David R. Peterson, Aurora, OH (US); James D. Daugherty, Brookfield, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/406,622

(22) Filed: Apr. 19, 2006

(65) Prior Publication Data

US 2007/0246241 A1 Oct. 25, 2007

(51) Int. Cl.
*H02G 15/02* (2006.01)

(52) U.S. Cl. .................................................... 174/74 R

(58) Field of Classification Search .............. 174/74 R, 174/75 F, 77 R, 78, 84 R, 86, 88 R
See application file for complete search history.

(56) References Cited

U.S. PATENT DOCUMENTS 4,834,670 A * 5/1989 Rodondi et al. ............ 439/398
5,221,215 A * 6/1993 Tan et al. ................ 439/620.1
6,093,041 A * 7/2000 Kay et al. ................... 439/225
6,398,580 B2 6/2002 Lin et al.

* cited by examiner

*Primary Examiner*—William H. Mayo, III
(74) *Attorney, Agent, or Firm*—David P. Wood

(57) ABSTRACT

An electrical splice assembly includes a bus plate having a plurality of coplanar, spaced male blades extending from the bus plate in cantilever fashion, a plurality of female terminals attached to the male blades, and a generally U-shaped housing of extrudable shape. The housing has an elongate open end portion defining a terminal receiving cavity, a closed end portion and an intermediate portion defining a slot that communicates with the terminal receiving cavity. The bus plate is at least partially disposed in the slot and the spaced male blades are at least partially disposed in the terminal receiving cavity along with the female terminals attached to them. The bus plate is a sheet metal stamping and the housing is an extrusion. The female terminals are attached to selected ones of the male blades to form a sub-assembly that is inserted laterally into the housing so the bus plate is at least partially disposed in the slot and the female terminals are disposed in the terminal receiving cavity. During manufacture a bus plate of appropriate length may be severed from a long sheet metal bus plate precursor and a housing of appropriate length may be severed from a long extruded housing precursor.

14 Claims, 1 Drawing Sheet

ELECTRICAL SPLICE ASSEMBLY

FIELD OF THE INVENTION

This invention relates to an electrical splice assembly.

BACKGROUND OF THE INVENTION

Current electrical splice assemblies are complicated to build utilizing injection molded components, and a sub-assembly process before final assembly and testing. Current electrical splice assemblies are expensive, have many different configurations and are very large making it difficult to package such assemblies in some vehicle areas.

SUMMARY OF THE INVENTION

In one aspect, the invention provides a very low cost, low profile, single circuit electrical splice assembly that includes a bus plate having a plurality of coplanar, spaced male blades extending from the bus plate in cantilever fashion, a plurality of female terminals attached to the male blades, and a generally U-shaped housing of extrudable shape. The housing has an elongate open end portion defining a terminal receiving cavity, a closed end portion and an intermediate portion defining a slot that communicates with the terminal receiving cavity. The bus plate is at least partially disposed in the slot and the spaced male blades are at least partially disposed in the terminal receiving cavity along with the female terminals attached to them.

In another aspect, the invention provides a method of making an electrical splice assembly in which a sheet metal bus plate having a plurality of coplanar, spaced male blades extending from the bus plate in cantilever fashion is stamped and in which a generally U-shaped housing of uniform cross section, having an elongate open end portion defining a terminal receiving cavity, a closed end portion, and an intermediate portion defining a slot that communicates with the terminal receiving cavity, is extruded. Female terminals are attached to selected ones of the male blades to form a sub-assembly that is inserted laterally into the extruded housing so the bus plate is at least partially disposed in the slot and the female terminals are disposed in the terminal receiving cavity.

In still another aspect, the invention provides a method of making an electrical splice assembly in which a sheet metal bus plate precursor having a plurality of coplanar, spaced male blades extending from the bus plate in cantilever fashion is stamped and in which a generally U-shaped housing precursor of uniform cross section, having an elongate open end portion defining a terminal receiving cavity, a closed end portion, and an intermediate portion defining a slot that communicates with the terminal receiving cavity, is extruded. A bus plate having a predetermined plurality of male blades is severed from the bus plate precursor while a housing having a terminal receiving cavity for receiving a like number of female terminals is severed from the housing precursor. The female terminals are attached to selected ones of the male blades to form a sub-assembly that is inserted laterally into the housing so the bus plate is at least partially disposed in the slot and the female terminals are disposed in the terminal receiving cavity.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

DETAILED DESCRIPTION OF A PREFERRED EMBODIMENT OF THE INVENTION

Figure 1:
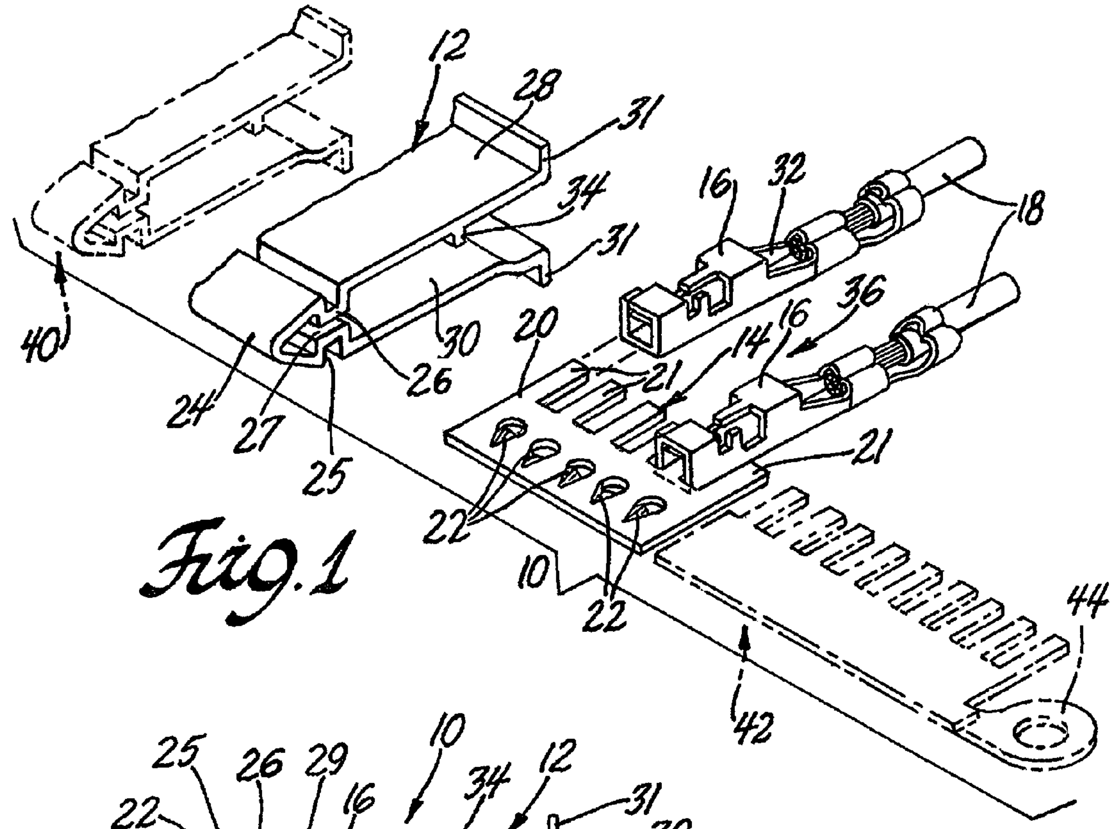
FIG. 1 is an exploded perspective view of an electrical splice assembly of the invention.

Referring now to the drawing, FIG. 1 is an exploded perspective view of an electrical splice assembly 10 of the invention. The electrical splice assembly 10 comprises an extrudable housing 12, a generally planar bus plate 14, and a plurality of female terminals 16 that are attached to the respective ends of insulated electric cables 18.

Bus plate 14 has a forward strap 20 and a plurality of coplanar, spaced male blades 21 that extend from a rearward end of the forward strap 20 in cantilever fashion. The forward strap 20 preferably includes a plurality of darts 22 that are laterally aligned and laterally spaced from each other. Some of the darts 22 project upwardly and some of the darts project downwardly with the preferred arrangement being that every other dart projects in the same direction as best shown in FIG. 1.

Figure 2:
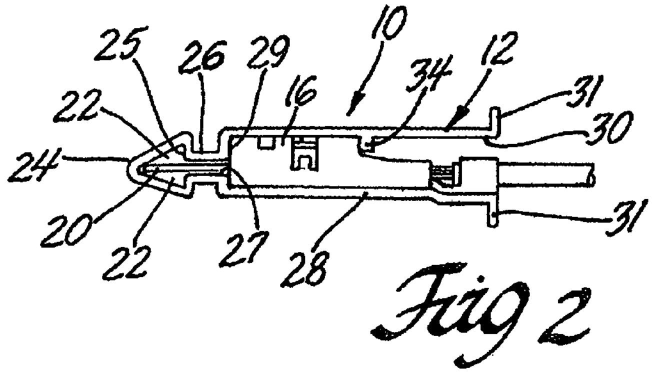
FIG. 2 is a side view of the electrical splice assembly of FIG. 1.

The extrudable housing 12 is a generally U-shaped housing of uniform cross section, having a triangular, forward closed end portion 24, an intermediate neck portion 26, and an elongate, rearward open end portion 28 defining a terminal receiving cavity 30 as best shown in FIG. 2. The rearward open end portion 28 preferably has outward flanges 31 at its terminus.

The triangular, forward closed end portion 24 receives the forward part of the forward strap 20 and the projecting darts 22 which engage internal retention shoulders 25 formed by the intermediate neck portion 26 to retain the bus plate 14 in the housing 12. The intermediate neck portion 26 defines a slot 27 that has a height that is substantially equal to the thickness of the generally planar bus plate 14. Slot 27 receives the rearward portion of the forward strap 20 while terminal receiving cavity 30 receives the spaced male blades 21 of the bus plate 14 and the plurality of female terminals 16 when they are attached to respective male blades 21. Female terminals 16 preferably include lock shoulders 32 and the extrudable housing 12 preferably includes a lateral rail 34 that cooperates with the lock shoulders 32 to retain the female terminals 16 in housing 12. Neck portion 26 also preferably provides internal stop shoulders 29 for the female terminals 16. Alternatively, the female terminals 16 may also stop against the forward strap 20.

Referring back to FIG. 1, the electrical splice assembly 10 is generally made in the following manner.

Bus plate 14 having the forward strap 20 and plurality of coplanar, spaced male blades 21 extending from the forward strap in cantilever fashion is stamped from a sheet metal blank. The optional plurality of darts 22 may be formed during the stamping operation or in a later forming operation.

In the meantime, the generally U-shaped housing 12 of uniform cross section having a triangular, forward closed end portion 24, an intermediate neck portion 26 and an elongate rearward open end portion 28 defining the terminal receiving cavity 30 is extruded, the housing 12 being made of an extrudable, electrical insulator material. Typical materials that can be extruded for automotive applications are nylon, polypropylene and polyethylene.

The plurality of female terminals 16 (previously attached to insulated electric cables 18) are then attached to the respective male blades 21 of bus plate 14 to form a subassembly 36. Female terminals 16 and male blades 21 may be provided with any conventional arrangement to lock the female terminals 16 to the respective male blades 21 (not shown).

When the housing 12 and the subassembly 36 are complete, subassembly 36 is inserted laterally into housing 12 so that the forward part of the strap 20 and the darts 22 are disposed in the triangular, closed end portion 24 of the housing, the rearward part of the strap 20 is disposed in the slot 27 of the intermediate neck portion 26, and the female terminals 16 and male blades 21 are disposed in the terminal receiving cavity 30. The subassembly 36 is preferable retained in the housing 12 in the longitudinal direction by the darts 22 of the bus plate 14 engaging the internal retention shoulders 25 of neck portion 26 and the lock shoulders 32 of the female terminal 16 engaging lateral rail 34.

Figure 3:
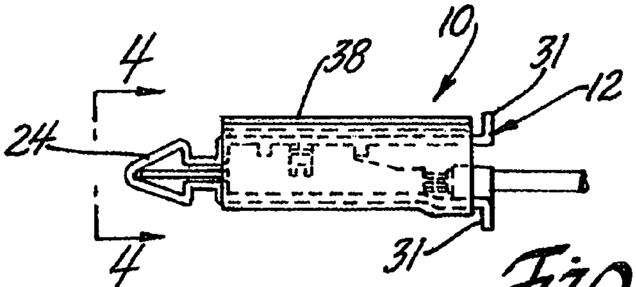
FIG. 3 is a side view of another electrical splice assembly of the invention.
Figure 4:
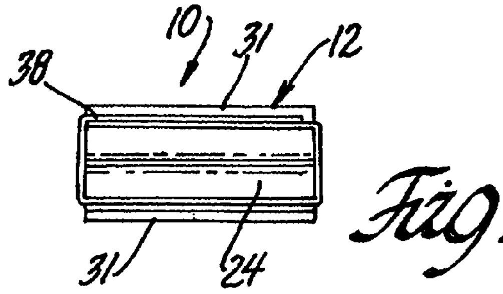
FIG. 4 is an end view of the electrical splice assembly of FIG. 3 taken substantially along the line 3-3 of FIG. 3 looking in the direction of the arrows.

To complete electrical splice assembly, the rearward open end portion 28 of housing 12 is then preferably wrapped with tape 38 as shown in FIGS. 3 and 4 to prevent the open end portion 28 from spreading apart as well as to help retain subassembly 36 in housing 12 in the lateral direction. A suitable tape is common vinyl tape, such as (M2147), a polyvinylchloride (PVC) pressure tape available from Plymouth Rubber Company of Connecticut. Flanges 31 facilitate handling of housing 12 during assembly as well as provide a guide for wrapping housing 12 with tape 38.

To take full advantage of the design of the electrical splice assembly 12, a housing precursor 40 for housing 12 of the same cross sectional shape as housing 12, is preferably extruded in a long length and a bus plate precursor 42 for bus plate 14 of the same plan form as bus plate 14, is also stamped in a long length so that several different sizes of electrical splice assemblies can be made from the long precursors 40 and 42. For instance, if a three-way splice is desired, bus plate 14 would be cut from the bus plate precursor 42 with just three male blades 21 while housing 12 would be cut from the housing precursor 40 to provide a terminal cavity 30 that receives three female terminals 16 that are attached to three male blades 21 respectively. For a four-way splice, bus plate 14 would be cut from precursor 42 with four male blades 21 with the housing 14 being sized to receive four female terminals 16. For a five-way, bus plate 14 would be cut with five male blades 21, etc.

Thus the method of making the electrical splice assembly 12 preferably involves severing a length of bus plate 14 having a predetermined plurality of male blades from a stamped bus plate precursor and severing from an extruded housing precursor, a length of extruded housing 12 having a terminal cavity for receiving a like predetermined plurality of female terminals.

Another option for the electrical splice assembly 10 of the invention accommodates instances where the bus plate 14 is grounded. In such an instance, the bus plate 14 may include an exposed ground terminal 44 such as a washer for fastening bus plate 14 to a ground such as a metal support panel (not shown). In such an instance, the exposed ground terminal 44 is preferably aligned with the forward part of strap 20 and remains outside housing 12 so that the rearward open end portion 28 of housing 12 in the resulting electrical splice assembly may still be taped if desired without any interference from the ground terminal 44.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. An electrical splice assembly comprising:

a bus plate having a plurality of coplanar, spaced male blades extending from the bus plate in cantilever fashion, and a generally U-shaped housing of extrudable shape, the housing having an elongate open end portion defining a terminal receiving cavity, a closed end portion and an intermediate portion that forms a slot communicating with the terminal receiving cavity, the bus plate being at least partially disposed in the slot and the spaced male blades being at least partially disposed in the terminal receiving cavity.

2. The electrical splice assembly of claim 1 wherein the elongate open end portion has a lateral rail of the generally U-shaped housing projecting into the terminal receiving cavity.

3. The electrical spice assembly of claim 1 wherein the bus plate has an integral ground terminal at one end.

4. The electrical spice assembly of claim 3 wherein the integral ground terminal is outside of the housing.

5. An electrical splice assembly comprising:

a bus plate having a forward strap and plurality of coplanar, spaced male blades extending from the forward strap in cantilever fashion, a plurality of female terminals attached to the plurality of spaced male blades respectively, and a generally U-shaped housing of uniform cross section, the housing having an elongate open end portion defining a terminal receiving cavity, a closed end portion, and an intermediate neck portion that forms a slot communicating with the terminal receiving cavity, the strap being at least partially disposed in the slot, and the female terminals being disposed in the terminal receiving cavity, and the elongate open end portion having a lateral rail of the generally U-shaped housing projecting into the terminal receiving cavity, to retain the female terminals.

6. The electrical splice assembly as defined in claim 5 wherein the strap of the bus plate has darts that engage an internal retention shoulder formed by the intermediate neck portion of the housing to retain the strap in the generally U-shaped housing.

7. The electrical splice assembly as defined in claim 5 wherein the closed end portion is triangular and wherein the strap of the bus plate has at least two darts extending in opposite directions from the strap and that engage respective internal retention shoulders formed by the intermediate neck portion of the housing.

8. The electrical splice assembly as defined in claim 7 wherein the intermediate neck portion forms internal stop shoulders for the female terminals.

9. The electrical splice assembly as defined in claim 7 wherein the elongate open end portion of the housing is wrapped with tape.

10. The electrical splice assembly as defined in claim 9 wherein the elongate open end portion has outward flanges at its terminus.

11. The electrical splice assembly as defined in claim 9 wherein the bus plate has an integral ground terminal at one end that is outside the housing.

12. An electrical splice assembly comprising:

a bus plate having a forward strap and plurality of coplanar, spaced male blades extending from the forward strap in cantilever fashion, a plurality of electric cables attached to a plurality of female terminals, the plurality of female terminals being attached to the plurality of spaced male blades respectively to form a sub-assembly, and a generally U-shaped housing having open lateral sides, the housing having an elongate open end portion defining a terminal receiving cavity, a closed end portion, and an intermediate neck portion that forms a slot communicating with the terminal receiving cavity, the sub-assembly being insertable into the generally U-shaped housing through one of the open lateral sides so that the strap is at least partially disposed in the slot, and the female terminals are disposed in the terminal receiving cavity, and the elongate open end portion having a lateral rail of the generally U-shaped housing projecting into the terminal receiving cavity to retain the female terminals.

13. The electrical splice assembly as defined in claim 12 wherein the closed end portion is triangular and wherein the strap of the bus plate has at least two darts extending in opposite directions from the strap and that engage respective internal retention shoulders formed by the intermediate neck portion of the housing.

14. The electrical splice assembly as defined in claim 13 wherein the elongate open end portion of the housing is wrapped with tape and has outward flanges at its terminus.

* * * * *